(No Model.)
W. W. TYSON.
FRUIT KNIFE.
No. 438,331. Patented Oct. 14, 1890.
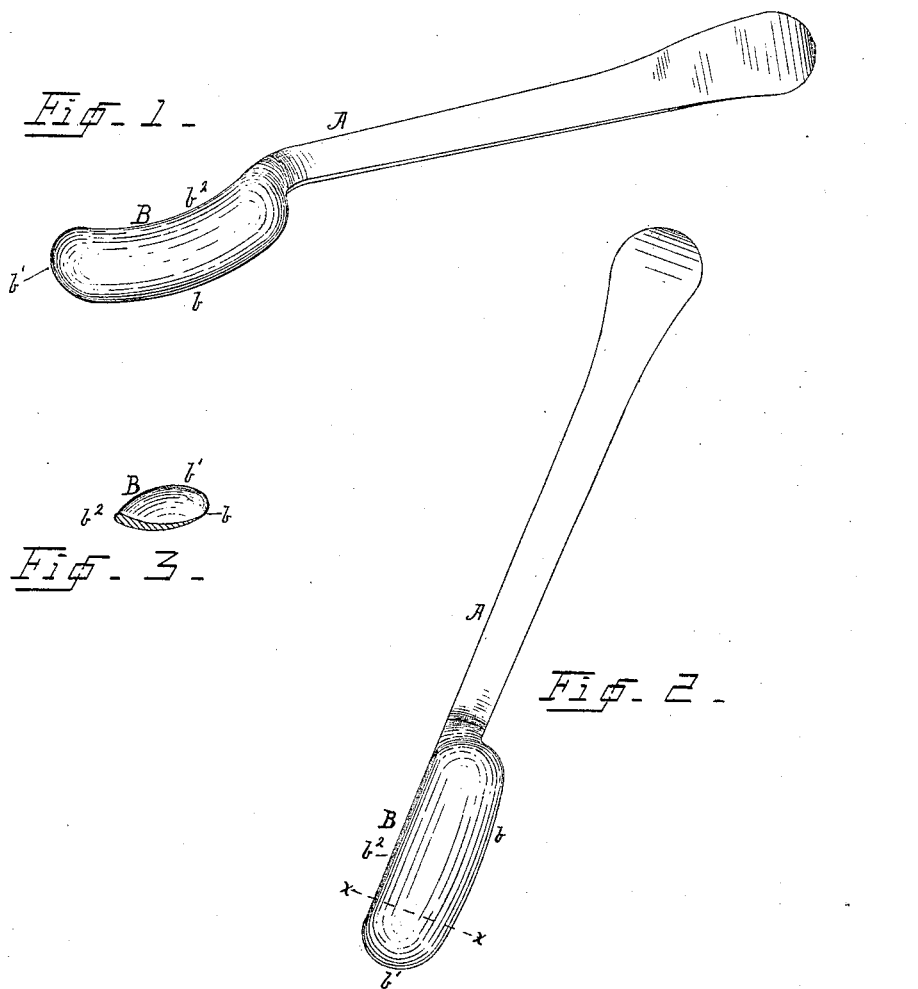
Witnesses. Inventor.

UNITED STATES PATENT OFFICE.

WILLIAM W. TYSON, OF ERIE, PENNSYLVANIA.

FRUIT-KNIFE.

SPECIFICATION forming part of Letters Patent No. 438,331, dated October 14, 1890.

Application filed May 26, 1890. Serial No. 353,282. (No model.)

*To all whom it may concern:*

Be it known that I, WILLIAM W. TYSON, a citizen of the United States, residing at Erie, in the county of Erie and State of Pennsylvania, have invented certain new and useful Improvements in Fruit-Knives; and I do hereby declare the following to be a full, clear, and exact description of the invention, such as will enable others skilled in the art to which it appertains to make and use the same.

This invention has for its object the production of a knife which is particularly adapted to cut and prepare an orange or other similar fruit for eating.

The invention consists in the particular form given to the blade, as will be fully hereinafter set forth.

The invention is illustrated in the accompanying drawings, as follows:

Figure 1 is a perspective view of the implement. Fig. 2 is a top or plan view of the same, and Fig. 3 is a transverse section of the blade, taken on the line $x\ x$ in Fig. 2.

The device consists in a handle A and blade B, the handle being of any form desired. The blade B is about the shape of a spoon-bowl cut in two lengthwise along one side of its longitudinal axis. It is brought to a cutting-edge along its side $b$ and end $b'$ and left thick and blunt along its side $b^2$, and therefore its side $b$ and end $b'$ may be called its cutting-edge and the side $b^2$ its back. The back $b^2$ is parallel with the longitudinal axis of the handle, while the cutting-edge $b\ b'$ is elliptical, and the whole blade curves downwardly as it springs from the handle, and then upwardly as it approaches the point, and it is concavo-convex in cross-section, giving it a slight dishing or spoon-like form.

The operation of using the implement is as follows: Take an orange in the left hand and hold it with the stem or bud-poll up. Then take the knife in the right hand, holding it between the thumb and fingers, as if it was a spoon, holding the hollow of the blade toward you. Then insert the point of the blade through the rind of the orange at a point somewhat below the poll and rotate the orange on its axis or move the knife around in a circle about the poll, and thus cut from the rind a circular piece, which remove. Then insert the knife into the pulp alongside of the core, reaching down to the opposite poll, and give the knife a circular movement or rotate the orange around its axis. This will dislodge the core and cut the radial membraneous partitions in the pulp. Then the pulp may be cut up by the knife as much as desired without cutting the skin, and then removed and eaten with a spoon.

If it is desired to remove the rind from the pulp without cutting the pulp the operator can, after removing the circular piece at the poll, insert the knife between the skin and the pulp with the hollow of the blade toward the pulp and then run it around between the skin and the pulp.

If the operator desires to pare off the rind in strips, the knife will be found to be more serviceable than a common straight knife.

If the operator prefers, he may cut the orange in two equatorially, and then use the semi-spoon-formed blade to loosen the pulp in the cells before removing it with a spoon.

What I claim as new is as follows:

As an article of manufacture, a fruit-knife having a handle A and a substantially semi-spoon-formed blade B, with its side $b$ and end $b'$ sharpened, substantially as and for the purpose mentioned.

In testimony whereof I affix my signature in presence of two witnesses.

WILLIAM W. TYSON.

Witnesses:
JNO. K. HALLOCK,
N. W. LOWELL.